(12) United States Patent
Colvin et al.

(10) Patent No.: US 7,096,172 B2
(45) Date of Patent: Aug. 22, 2006

(54) SYSTEM AND METHOD FOR AUTOMATED RESERVOIR TARGETING

(75) Inventors: Richard Daniel Colvin, Dripping Springs, TX (US); Glenn Robert McColpin, Houston, TX (US)

(73) Assignee: Landmark Graphics Corporation, a division of Halliburton Energy Services, Inc., Houston, TX (US)

( * ) Notice: Subject to any disclaimer, the term of this patent is extended or adjusted under 35 U.S.C. 154(b) by 106 days.

(21) Appl. No.: 10/622,976

(22) Filed: Jul. 18, 2003

(65) Prior Publication Data

US 2004/0153298 A1 Aug. 5, 2004

Related U.S. Application Data

(60) Provisional application No. 60/444,281, filed on Jan. 31, 2003.

(51) Int. Cl.
*G06F 9/455* (2006.01)

(52) U.S. Cl. .............. 703/10; 702/12; 702/13

(58) Field of Classification Search ............ 703/2, 703/10; 702/12, 13, 2, 14; 345/420, 762; 367/41
See application file for complete search history.

(56) References Cited

U.S. PATENT DOCUMENTS

| | | | |
|---|---|---|---|
| 4,249,776 A | 2/1981 | Shuck et al. ............... 299/4 |
| 5,517,428 A | 5/1996 | Williams ............... 703/1 |
| 5,740,342 A * | 4/1998 | Kocberber ............... 345/420 |
| 5,757,663 A | 5/1998 | Lo et al. ............... 364/509 |
| 5,844,799 A | 12/1998 | Joseph et al. ............... 702/2 |
| 6,006,832 A | 12/1999 | Tubel et al. ............... 166/250.021 |
| 6,236,894 B1 | 5/2001 | Stoisits et al. ............... 700/28 |
| 6,315,054 B1 | 11/2001 | Brunet ............... 166/387 |
| 6,549,879 B1 * | 4/2003 | Cullick et al. ............... 703/10 |
| 2002/0013687 A1 * | 1/2002 | Ortoleva ............... 703/10 |
| 2002/0067373 A1 * | 6/2002 | Roe et al. ............... 345/762 |
| 2002/0120429 A1 * | 8/2002 | Ortoleva ............... 703/2 |
| 2002/0165671 A1 * | 11/2002 | Middya ............... 702/12 |
| 2003/0023383 A1 * | 1/2003 | Stark ............... 702/14 |
| 2003/0043693 A1 * | 3/2003 | Eastwood et al. ............... 367/41 |
| 2003/0204311 A1 * | 10/2003 | Bush ............... 702/13 |
| 2003/0220739 A1 * | 11/2003 | Feldman et al. ............... 702/2 |

OTHER PUBLICATIONS

Karl P. Norrena, Clayton V. Deutsch, University of Alberta, Automatic Determination of Well Placement Subject to Geostatistical and Economic Constraints, SPE 78996, SPE/PS-CIM/CHOA International Thermal Operation and Heavy Oil Symposium and International Horizontal Well Technology Conference, Nov. 2002.

(Continued)

*Primary Examiner*—Paul L. Rodriguez
*Assistant Examiner*—Kandasamy Thangavelu
(74) *Attorney, Agent, or Firm*—Merchant & Gould (57) ABSTRACT

Methods and systems for reservoir targeting, the systems implementing methods comprising filtering a plurality of values in a three-dimensional model to eliminate values which are below a threshold to create a filtered three-dimensional model; developing a first matrix from the filtered three-dimensional model representing a two-dimensional model of the reservoir, wherein the first matrix includes a plurality of cell center locations, cell areas, and the plurality of values; developing a second matrix from the first matrix using a distance-weighted sum of the plurality of values; and selecting target locations from the second matrix based on the distance-weighted sum of the plurality of values.

12 Claims, 10 Drawing Sheets

OTHER PUBLICATIONS

Seifert, D., Lewis, J.J.M., Hem, C.Y., and Steel, N.C.T., "Well Placement Optimisation and Risking Using 3-D Stochastic Reservoir Modeling Techniques", SPE 35520, presented at the NPF/SPE European Reservoir Modelling Conference, Stavanger, Apr. 1996.

Rosenwald, G. W., and Green, D. W., "A Method for Determining the Optimum Location of Wells in a Reservoir Using Mixed-Integer Programming", SPE J., (1973).

Lars Kjellesvik and Geir Johansen, "Uncertainty Analysis of Well Production Potential, Based on Streamline Simulation of Multiple Reseroir Realisations", EAG/SPE Petroleum Geostatistics Symposium, Toulouse, Apr. 1999.

Beckner, 6. L. and Song X., "Field Development Planning Using Simulated Annealing - Optimal Economic Well Scheduling and Placement", SPE 30650, Annual SPE Technical Conference and Exhibition, Dallas, Oct. 22-25, 1995.

Vasantharajan S. and Cullick, A.S., "Well Site Selection Using Integer Programming Optimization", IMAG Annual Meeting, Barcelona, Sep. 1997.

Ierapetritou, M. G., Floudas, C. A,, Vasantharajan, S., and Cullick, A. S., "A Decomposition Based Approach for Optimal Location of Vertical Wells", AICHE Journal 45, Apr. 1999, pp. 844-859.

\* cited by examiner

SYSTEM AND METHOD FOR AUTOMATED RESERVOIR TARGETING

RELATED APPLICATIONS

This application claims priority to U.S. Provisional Application Ser. No. 60/444,281, filed on Jan. 31, 2003, which is incorporated herein by reference.

FIELD OF THE INVENTION

The invention relates generally to methods for reducing the time and/or cost associated with extraction of hydrocarbons from underground reservoirs. More specifically, the present invention relates to systems and methods for automating the selection of targets for well placement, using two-dimensional matrixes that represent a three-dimensional model of the reservoir.

BACKGROUND OF THE INVENTION

Historically, to arrive at a set of targets for the placement of wells for the extraction of hydrocarbons, a manual process is used in which the surfaces representing the top, bottom surface, or intermediate surface of the reservoir is interpreted from seismic data to place the targets. In this process, the surface is overlaid with a color-coded attribute overlay, which may be comprised of attributes indicating the porosity, permeability, saturations, or other characteristics of the reservoir. Based on the color-coded attributes, the target locations are visually selected, the attribute color coding being the primary indicator of the target location.

In the above method, since the color coding is used as the primary cue for target location, it is very difficult to take into consideration the drainage radius and an entire three-dimensional model of a reservoir, because only the attributes of a surface are being considered. To take into consideration the entire three-dimensional model of the reservoir, this method would entail sequentially evaluating adjacent layers of the reservoir until the entire reservoir is completely evaluated, while attempting to remember the attributes associated with each of the previous layers. This a very tedious and time consuming process.

In another historically used and more accurate method than the above, the raw seismic data is visually analyzed for so called "bright spots." The bright spots are basically high or low amplitude attribute areas indicative of the porosity, permeability, saturations, or other characteristic of the reservoir. In this process, a geocellular model of the entire reservoir is created rather than evaluating a selected horizontal surface of the reservoir and filtering the model to only display the areas or "bright spots" that have certain desirable attributes. In similar fashion to the previous method, in this method, the targets are also manually selected on the resulting geobodies. This is also a time consuming and inaccurate method of locating targets.

Therefore, there is a need for an automated method for locating targets for a hydrocarbon reservoir. A method where a user sets a series of filters for processing a three-dimensional geocellular model, an expected drainage radius for each target, and the maximum number of allowable targets. Then a computer implemented method traverses the geocellular model targeting areas that meet the filtering criteria and target spacing constraints. The method may eliminate overlapping targets; therefore, the method may optimize the location of each target by optimizing the cells that are targeted. If more target areas meet the filtering and spacing criteria than the maximum allowable number, the method may only display targets in the most desirable areas by evaluating the cells under each target both horizontally and vertically and weighing each target location.

This automated process would be more desirable than the process discussed above of interpreting a surface of the reservoir, because the entire three-dimensional model of the reservoir may be taken into account, and the implemented selection process results in a more accurate selection of desirable target locations than the human selections based on visual inspection of the attributes overlaid on the surface. Furthermore, this automated process would be more accurate when compared to the method using the geocellular model, because the spacing radius may be optimized and the targets are weighted based on the cells under each target so that the placement is much more optimized than if done by human analysis. This automated process may result in an increase in accuracy and substantial time savings in the process of locating targets for well placement.

Embodiments of the present invention are directed at overcoming one or more of the above deficiencies described in the art.

SUMMARY OF THE INVENTION

In accordance with an exemplary embodiment of the present invention, methods and systems are provided for automated reservoir targeting. For automated reservoir targeting, the systems implement methods comprising filtering a plurality of attribute values in a three-dimensional model to eliminate attribute values which are below a threshold to create a filtered three-dimensional model; developing a first matrix from the filtered three-dimensional model representing a two-dimensional model of the reservoir, wherein the first matrix includes a plurality of cell center locations, cell areas and a plurality of attribute values; developing a second matrix from the first matrix using a distance-weighted sum of plurality of attribute values; and selecting target locations from the second matrix based on the distance-weighted sum of the plurality of attribute values.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, which are illustrated in the accompanying drawings. Wherever possible, the same reference numbers will be used throughout the drawings to refer to the same or like parts.

System Architecture

Figure 1:
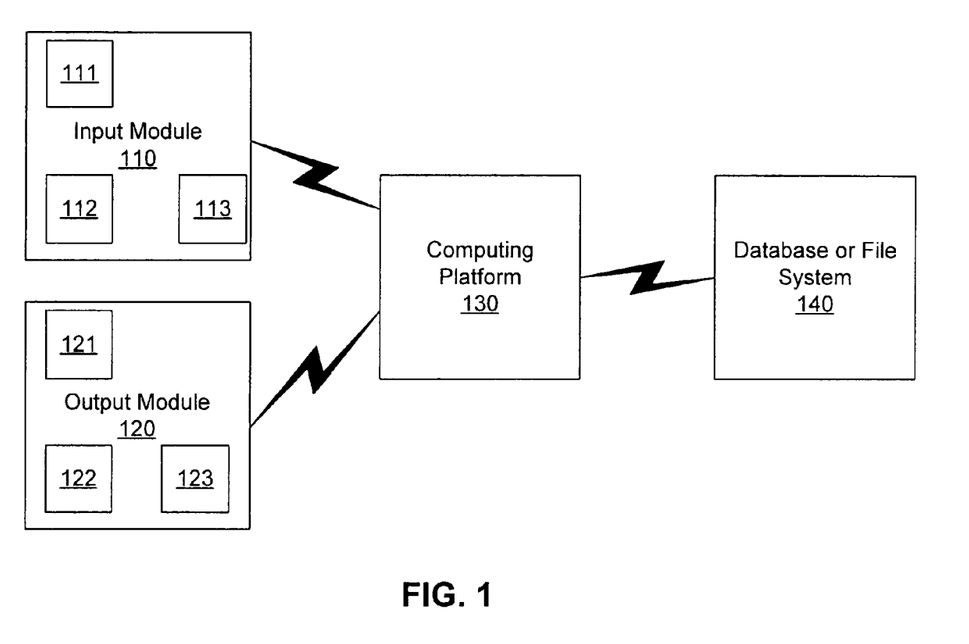
FIG. 1 is a system environment in accordance with the principles of the present invention.

By way of a non-limiting example, FIG. 1 illustrates a computer system in which the features and principles of the present invention may be implemented. As illustrated in the block diagram of FIG. 1, a system environment consistent with an embodiment of the present invention may include an input module 110, an output module 120, a computing platform 130, and a database or file system 140. Computing platform 130 is adapted to include the necessary functionality and computing capabilities to implement the automated target select and platform generation methodology through the associated components (input module 110, output module 120, and database or file system 140).

In the embodiment of FIG. 1, computing platform 130 may comprise a PC or PDA for performing various functions and operations of the invention. Computing platform 130 may be implemented, for example, by a general purpose computer selectively activated or reconfigured by a computer program stored in the computer, or may be a specially constructed computing platform for carrying out the features and operations of the present invention. Computing platform 130 may also be implemented or provided with a wide variety of components or subsystems including, for example, one or more of the following: one or more central processing units, a co-processor, memory, registers, and other data processing devices and subsystems. Computing platform 130 also communicates or transfers dynamic analysis input and output to and from input module 110 and output module 120 through the use of direct connections or communication links, as illustrated in FIG. 1.

Alternatively, communication between computing platform 130 and modules 110, 120 can be achieved through the use of a network architecture (not shown). In the alternative embodiment (not shown), the network architecture may comprise, alone, or in any suitable combination, a telephone-based network (such as a PBX or POTS), a local area network (LAN), a wide area network (WAN), a dedicated intranet, and/or the Internet. Further, it may comprise any suitable combination of wired and/or wireless components and systems. By using dedicated communication links or shared network architecture, computing platform 130 may be located in the same location or at a geographically distant location from input module 110 and/or output module 120.

Input module 110 of the system environment shown in FIG. 1 may be implemented with a wide variety of devices to receive and/or provide the data as input to computing platform 130. As illustrated in FIG. 1, input module 110 includes an input device 111, a storage device 112, and/or a network 113. Input device 111 may include a keyboard, a mouse, a disk drive, video camera, magnetic card reader, or any other suitable input device for providing customer information to computing platform 130. Memory device may be implemented with various forms of memory or storage devices, such as read-only memory (ROM) devices and random access memory (RAM) devices. Storage device 112 may include a memory tape or disk drive for reading and providing information on a storage tape or disk as input to computing platform 120. Input module 110 may also include network interface 113, as illustrated in FIG. 1, to receive data over a network (such as a LAN, WAN, intranet or the Internet) and to provide the same as input to computing platform 130. For example, network interface 113 may be connected to a public or private database over a network for the purpose of receiving information about the customers from computing platform 130.

As illustrated in FIG. 1, output module 120 includes a display adapter 121, a printer device adapter 122, and/or a network interface 123 for receiving the results provided as output from computing module 120. The output from computing platform 130 may be displayed or viewed through display adapter 121 (such as a CRT or LCD) and printer device adapter 122. If needed, network interface 123 may also be provided to facilitate the communication of the results from computer platform 130 over a network (such as a LAN, WAN, intranet or the Internet) to remote or distant locations for further analysis or viewing.

Automated Target Selection

Operational Description

In an exemplary embodiment of the present invention, computer automated methods utilize a three-dimensional geocellular model of the reservoir. A user sets a series of filters to be applied to the three-dimensional geocellular model, an expected drainage radius for each target, and the maximum number of allowable targets. Then the automated methods traverse the geocellular model targeting areas which meet the filtering criteria and the predetermined target spacing constraints. If overlapping targets are identified, the overlapping targets are eliminated so the methods optimize the location of each target by optimizing the desirable cells that are targeted. If more target areas meet the filtering and spacing criteria than the maximum allowable number, the algorithm may display targets in the most desirable areas by evaluating the cells under each target both horizontally and vertically and weighing each target location.

In an initial stage of the methods of one embodiment, seismic data sets are used to build a three-dimensional model. Geoscientists use a modeling program, such as Decision Space™ Powermodel™, to interpret the seismic data sets both for the top and bottom of the reservoir in question to develop the three-dimensional model. Power-Model™ is built on gOcad technology developed by the gOcad Consortium and is available from Landmark, a Halliburton company, of Houston, Tex. The three-dimensional model provides a representation of the reservoir underneath the surface. The characteristics of the three-dimensional model, e.g., porosity, may be indicative of whether there are hydrocarbons in the reservoir.

In addition to the seismic data, exploratory drilling may also be utilized along with logging tools to retrieve readings that are then correlated to the seismic data sets. For example, measurements may be obtained for gamma ray, neutron porosity, or bulk density. Once the location of these measurements are determined, the measurements are correlated to the seismic data sets to improve the three-dimensional model. The resulting three-dimensional models are a set of irregularly spaced and perhaps irregularly shaped six sided cells with eight corner points and one or more attributes stored within. All of these cells may be combined to generate a three-dimensional model of a particular reservoir.

Figure 2:
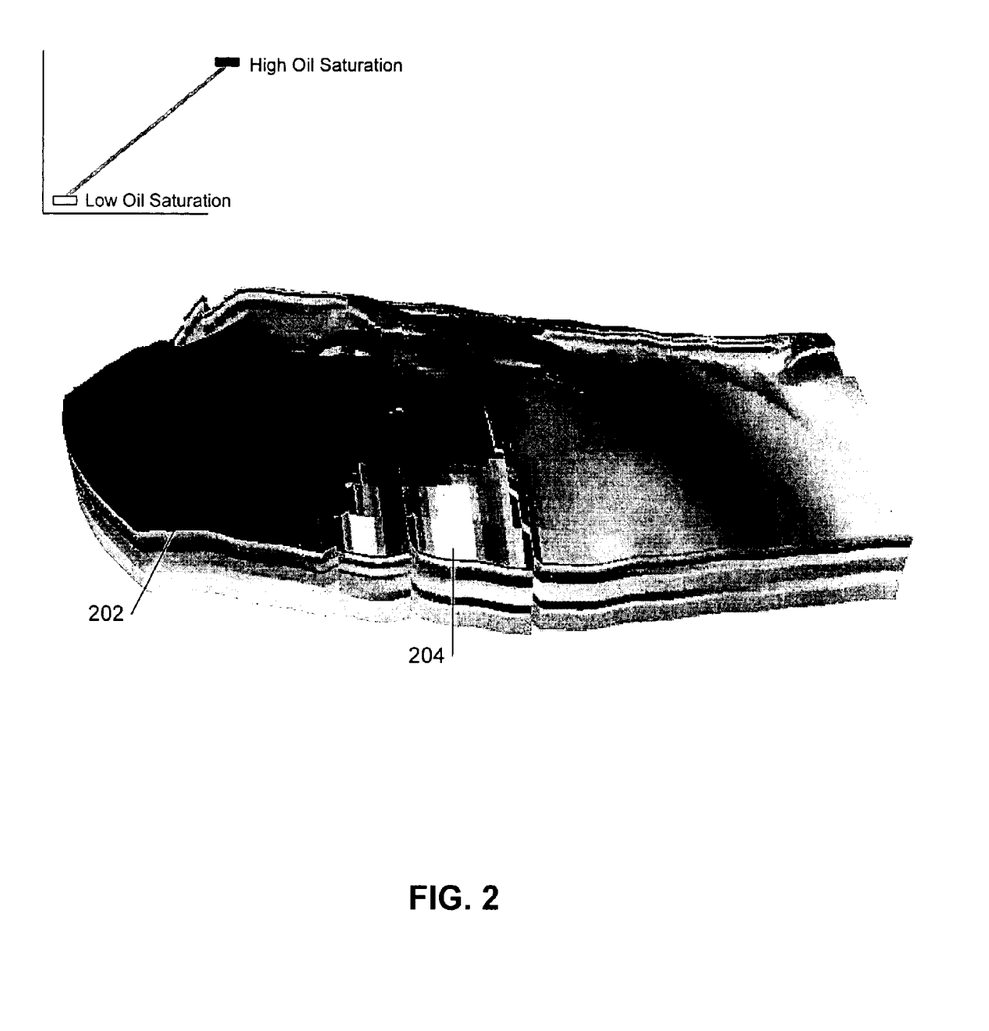
FIG. 2 illustrates an exemplary three-dimensional model representing the distribution of porosity associated with an exemplary reservoir in accordance with the principles of the present invention.
Figure 3:
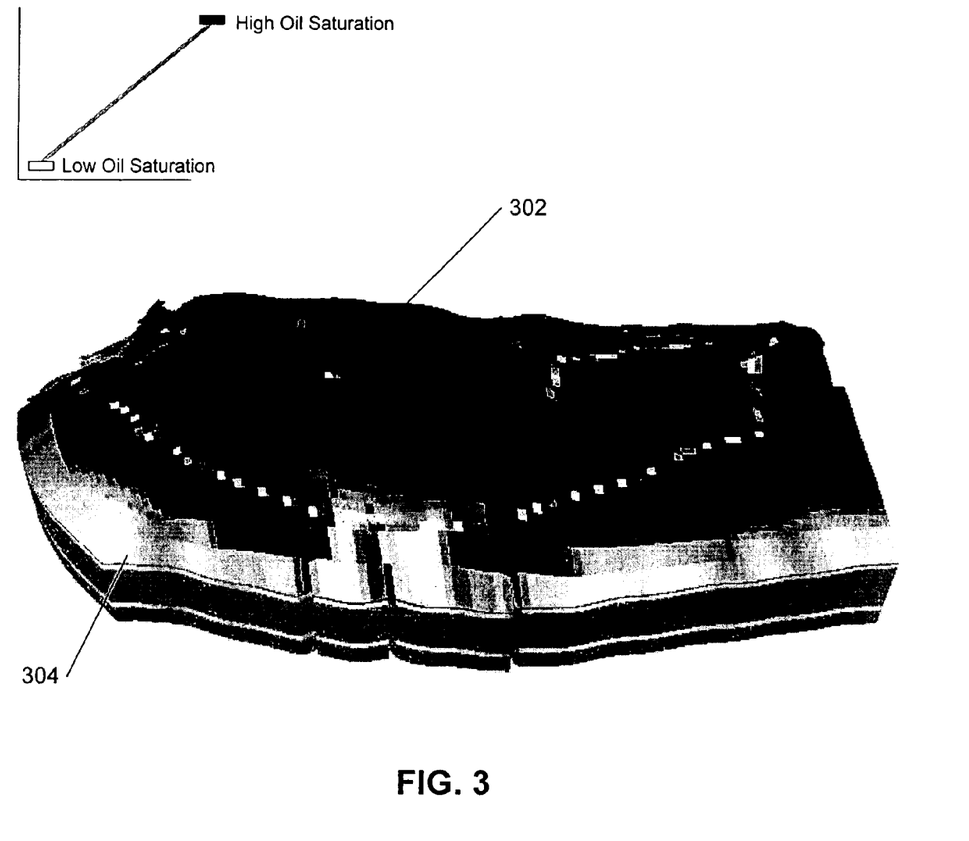
FIG. 3 illustrates an exemplary three-dimensional model representing the distribution of oil saturation associated with an exemplary reservoir in accordance with the principles of the present invention.

FIGS. 2 and 3, respectively, illustrate an exemplary three-dimensional model representing the distribution of the porosity and oil saturation values associated with an exemplary reservoir. In FIGS. 2 and 3, the represented values are shown on a gray scale. The dark shade areas (202 and 302) represent areas containing high concentrations of the represented values (porosity or oil saturation) and the light shaded areas (204 and 304) represent areas containing low concentrations of the represented value. The areas with concentration values ranging between the high and low concentrations are shown in a gray scale proportionate to the level of concentration.

Once the three-dimensional model is generated, targets are generally selected based on a particular property or attribute, while making sure that certain other properties are within certain ranges. The targets may also be selected to obtain proper spacing. Target spacing is a consideration in the selection process because the location of the particular property of interest, e.g., porosity or oil saturation, may be concentrated in a specific area of the reservoir, and it is undesirable to locate multiple targets within a concentrated area that can possibly be served by one target. The target selection process will be discussed in greater detail below.

Figure 4:
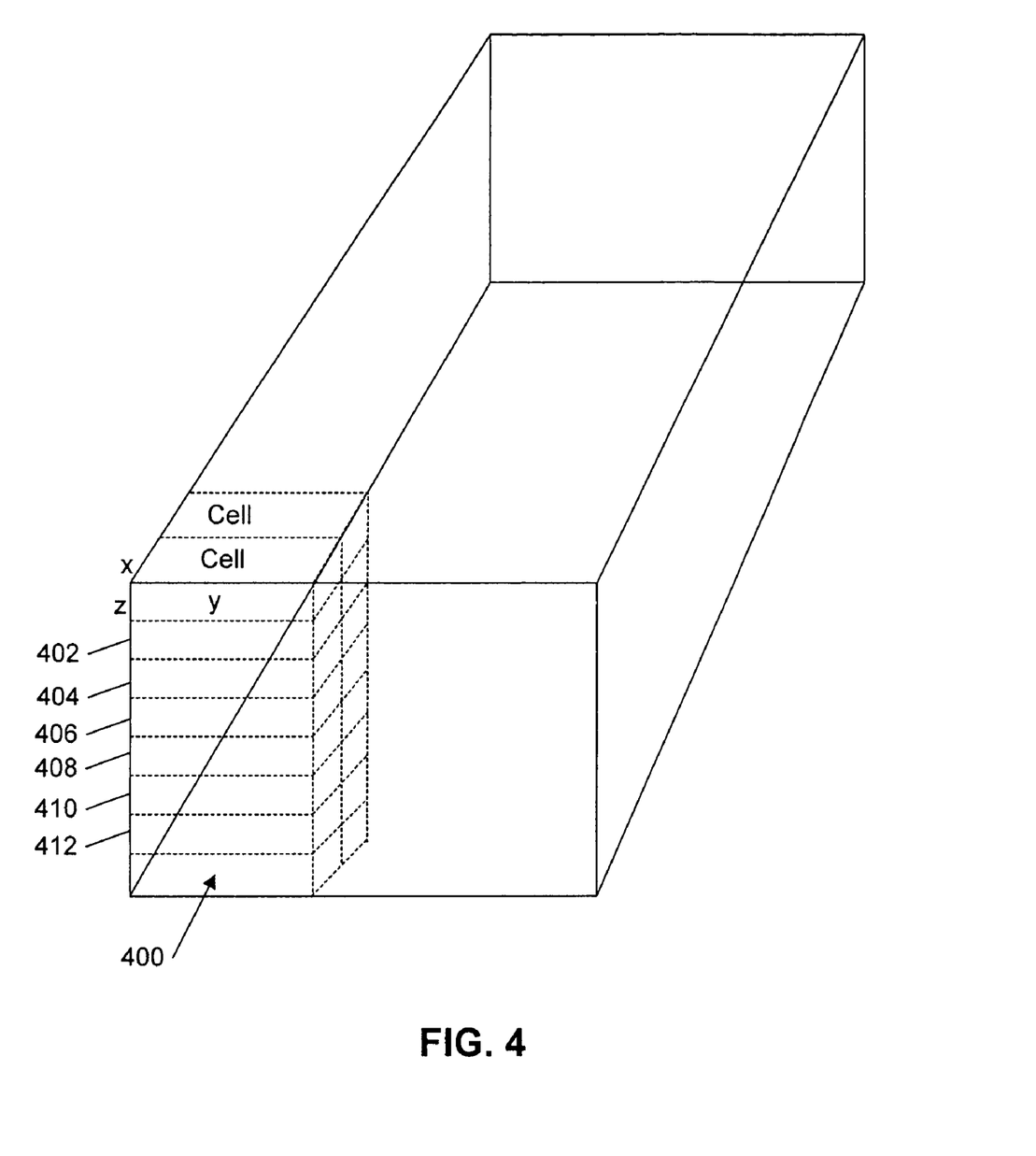
FIG. 4 illustrates an exemplary schematic model including a column of exemplary cells in accordance with the principles of the present invention.

In the method of one exemplary embodiment of the invention, the three-dimensional model may be triangulated to create a three dimensional grid (X, Y, and Z axis) of cells (schematic model). FIG. 4 illustrates an exemplary schematic model including a column 400 of exemplary cells (402–412). Once the triangulation process is complete, for each X and Y coordinate, the schematic model is traversed in the Z direction to filter out cell locations that do not meet one or more predetermined selection criteria (e.g., porosity >0.2 and/or oil saturation >0.3).

Figure 5:
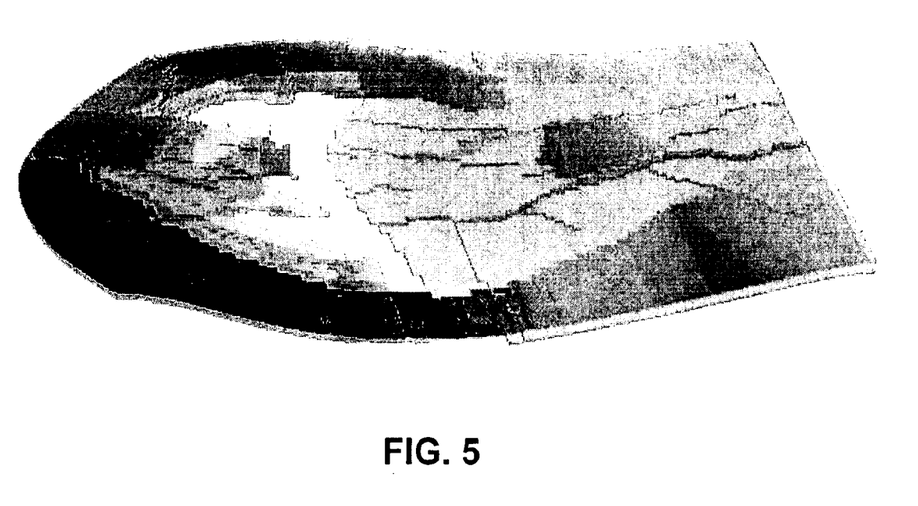
FIG. 5 illustrates a three-dimensional model representation of a filtered three-dimensional model in accordance with the principles of the present invention.

FIG. 5 illustrates a three-dimensional representation of a filtered three-dimensional model. This filtered model may correlate to the three-dimensional models of FIGS. 2 and 3.

Figure 6:
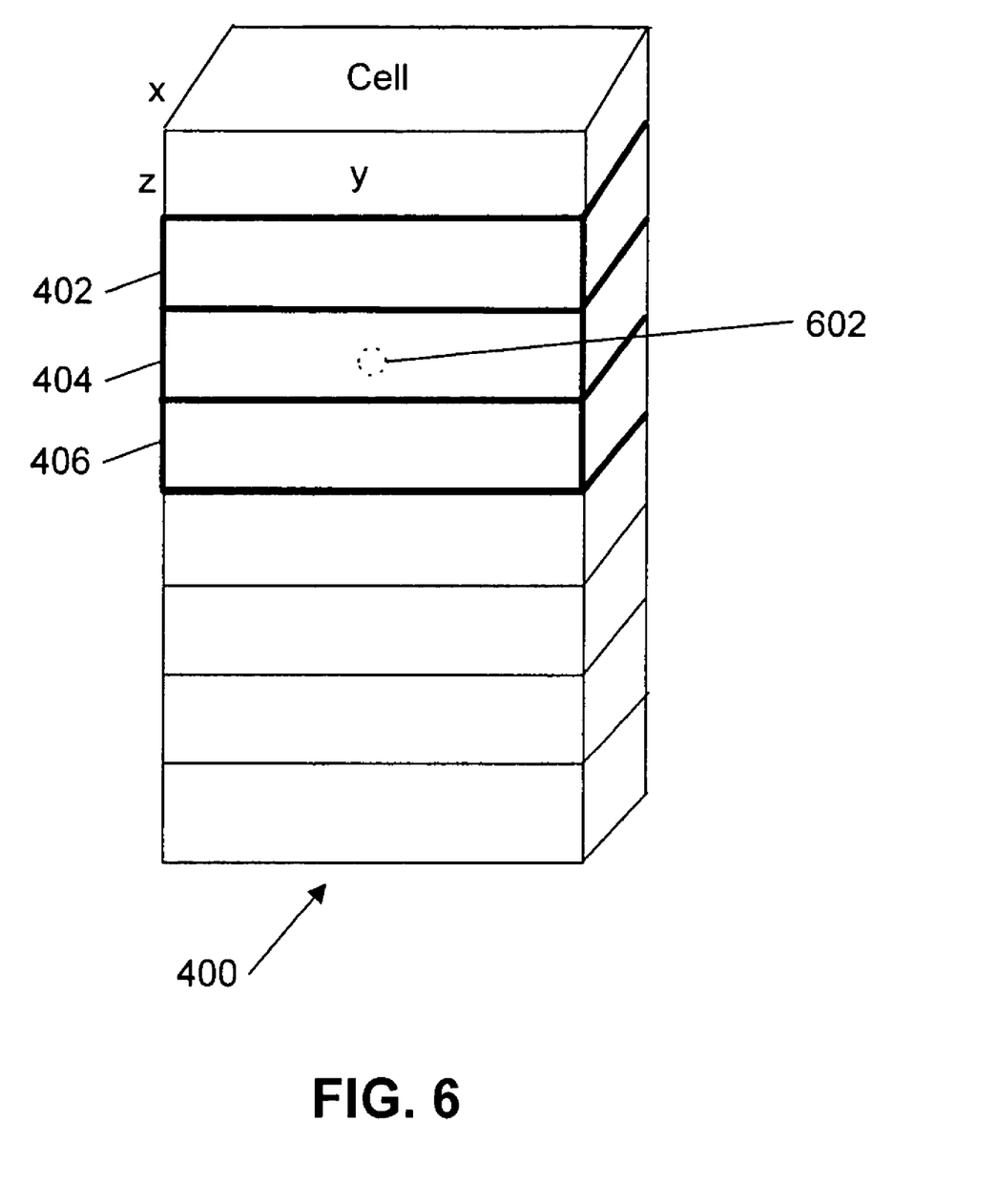
FIG. 6 illustrates a sliding window applied to an exemplary column of cells in accordance with the principles of the present invention.

Once the three dimensional model has been filtered, the preferred method may determine the most desirable set of contiguous cells that meet one or more of the filtering criteria. The most desirables cells may be located using a windowing technique in which a sliding window composed, for example, of three cells or three layers may be used to find the location of the most desirable three continuous layers. The window size may be determined by the number of layers in the three-dimensional model. FIG. 6 provides an illustration of a sliding window being applied to cells 402–406.

If cells 402–406 are determined to be the most desirable cells in column 400, then the location of the center point or the midpoint 602 of these three layers is identified along with the value of the particular property of interest, for example the porosity or oil saturation value associated with the center point. The forgoing process distills the schematic model down to a two dimensional value matrix representing the most desirable layers in the columns of the schematic model. Every column in the model is represented by row and column indices (matrix entry) in the value matrix and each matrix entry may contain the value of the property of interest (e.g., porosity or oil saturation).

Table 1 below illustrates an exemplary value matrix for a distilled three-dimensional model. Even though the value matrix of Table 1 only includes the value of the property of interest (porosity), the matrix may also contain the X, Y, Z location of the center point of the cell selected for the column and the area of the cell. The matrix of Table 1 is derived by maximizing the porosity values, using a window that is three cell-layers thick, and filtering in a tight range (0.236–0.292 porosity); therefore, the numbers are fairly consistent and in the range of 0.75–0.762 porosity (cumulative values of a three cell window). The data in Table 1 is fairly homogeneous; however, other datasets may have much more diversity.

TABLE 1

|  | y1 | y2 | y3 | y4 | y5 | y6 | y7 | y8 | y9 | y10 | y11 | y12 | y13 | y14 | y15 | y16 | y17 | y18 |
|---|---|---|---|---|---|---|---|---|---|---|---|---|---|---|---|---|---|---|
| x1 | 0.492 | 0.746 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x2 | 0.746 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x3 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x4 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x5 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x6 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x7 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x8 | 0.761 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x9 | 0.761 | 0.761 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x10 | 0.761 | 0.761 | 0.761 | 0.762 | 0.762 | 0.762 | 0.762 | 0.762 | 0.762 | 0.762 | 0.762 | 0.762 | 0.762 | 0.762 | 0.762 | 0.762 | 0.762 | 0.762 |
| x11 | 0.76 | 0.761 | 0.761 | 0.761 | 0.762 | 0.762 | 0.762 | 0.762 | 0.762 | 0.762 | 0.762 | 0.762 | 0.762 | 0.762 | 0.762 | 0.762 | 0.762 | 0.762 |
| x12 | 0.76 | 0.761 | 0.761 | 0.761 | 0.761 | 0.762 | 0.762 | 0.762 | 0.762 | 0.762 | 0.762 | 0.762 | 0.762 | 0.762 | 0.762 | 0.762 | 0.762 | 0.762 |
| x13 | 0.76 | 0.76 | 0.761 | 0.761 | 0.761 | 0.761 | 0.762 | 0.762 | 0.762 | 0.762 | 0.762 | 0.762 | 0.762 | 0.762 | 0.762 | 0.762 | 0.762 | 0.762 |
| x14 | 0.759 | 0.759 | 0.76 | 0.76 | 0.761 | 0.761 | 0.761 | 0.762 | 0.762 | 0.762 | 0.762 | 0.762 | 0.762 | 0.762 | 0.762 | 0.762 | 0.762 | 0.762 |

Next in the method of one embodiment of the present invention, a summation matrix is generated based on the value matrix. In contrast to the value matrix, the summation matrix is used to determine the best cell location that's surrounded by other desirable cells (cells with desirable property values), not to determine the best single cell location. The summation matrix includes the accumulated values for each of the entries in the value matrix. Table 2 below illustrates an exemplary summation matrix, wherein the calculations described below have been applied to the value matrix of Table 1.

In Table 2, the value in bold at location (X12, Y12) has been calculated to be the most desirable location of the processed three-dimensional model.

user-defined value representing the reservoir draining radius for each target. The SpacingRadius may be selected by the user based on a number of parameters (e.g., government regulations and/or financial considerations).

The calculations to arrive at the accumulated value are used to take into account the geometry of the various cells. If in the three-dimensional model, the cells are of relatively the same size then the above calculations may be unnecessary. However, in most models, the cells are of irregular geometry. For example, the center cells may be large cells, while the cells around the edges may be small cells. Therefore, if the cell values were summed or the cells were weighted based on distance, clusters of small cells may be improperly favored over large cells. On the other hand, if the

TABLE 2

|     | y1    | y2    | y3    | y4    | y5    | y6    | y7    | y8    | y9    | y10   | y11   | y12   | y13   | y14   | y15   | y16   | y17   | y18   |
|-----|-------|-------|-------|-------|-------|-------|-------|-------|-------|-------|-------|-------|-------|-------|-------|-------|-------|-------|
| x1  | 0.336 | 0.37  | 0.399 | 0.422 | 0.439 | 0.448 | 0.45  | 0.448 | 0.445 | 0.441 | 0.436 | 0.429 | 0.42  | 0.407 | 0.375 | 0.349 | 0.335 | 0.279 |
| x2  | 0.365 | 0.389 | 0.413 | 0.433 | 0.448 | 0.456 | 0.458 | 0.456 | 0.454 | 0.45  | 0.445 | 0.438 | 0.429 | 0.414 | 0.38  | 0.358 | 0.34  | 0.278 |
| x3  | 0.395 | 0.414 | 0.432 | 0.447 | 0.458 | 0.465 | 0.466 | 0.465 | 0.462 | 0.459 | 0.454 | 0.448 | 0.439 | 0.422 | 0.388 | 0.368 | 0.346 | 0.276 |
| x4  | 0.424 | 0.438 | 0.45  | 0.461 | 0.469 | 0.473 | 0.474 | 0.474 | 0.472 | 0.468 | 0.463 | 0.457 | 0.449 | 0.43  | 0.398 | 0.379 | 0.354 | 0.275 |
| x5  | 0.446 | 0.457 | 0.467 | 0.473 | 0.479 | 0.482 | 0.483 | 0.483 | 0.481 | 0.478 | 0.474 | 0.467 | 0.459 | 0.438 | 0.411 | 0.392 | 0.364 | 0.275 |
| x6  | 0.463 | 0.472 | 0.479 | 0.484 | 0.487 | 0.489 | 0.49  | 0.49  | 0.489 | 0.486 | 0.482 | 0.476 | 0.466 | 0.445 | 0.421 | 0.402 | 0.373 | 0.276 |
| x7  | 0.471 | 0.477 | 0.482 | 0.485 | 0.487 | 0.49  | 0.492 | 0.494 | 0.495 | 0.496 | 0.494 | 0.49  | 0.482 | 0.456 | 0.438 | 0.419 | 0.387 | 0.28  |
| x8  | 0.472 | 0.479 | 0.486 | 0.492 | 0.498 | 0.503 | 0.507 | 0.511 | 0.513 | 0.514 | 0.513 | 0.51  | 0.499 | 0.475 | 0.458 | 0.436 | 0.402 | 0.283 |
| x9  | 0.483 | 0.491 | 0.498 | 0.504 | 0.51  | 0.515 | 0.519 | 0.523 | 0.525 | 0.526 | 0.526 | 0.524 | 0.514 | 0.492 | 0.478 | 0.452 | 0.415 | 0.297 |
| x10 | 0.489 | 0.496 | 0.502 | 0.509 | 0.514 | 0.519 | 0.525 | 0.531 | 0.537 | 0.542 | 0.546 | 0.548 | 0.537 | 0.52  | 0.505 | 0.478 | 0.437 | 0.31  |
| x11 | 0.488 | 0.497 | 0.507 | 0.517 | 0.526 | 0.534 | 0.542 | 0.55  | 0.557 | 0.563 | 0.568 | 0.571 | 0.56  | 0.545 | 0.532 | 0.503 | 0.459 | 0.316 |
| x12 | 0.501 | 0.511 | 0.522 | 0.531 | 0.541 | 0.549 | 0.557 | 0.565 | 0.572 | 0.578 | 0.583 | 0.586 | 0.577 | 0.565 | 0.552 | 0.523 | 0.478 | 0.336 |
| x13 | 0.508 | 0.517 | 0.525 | 0.533 | 0.541 | 0.548 | 0.555 | 0.561 | 0.567 | 0.573 | 0.578 | 0.582 | 0.577 | 0.572 | 0.554 | 0.536 | 0.498 | 0.358 |
| x14 | 0.377 | 0.383 | 0.389 | 0.395 | 0.402 | 0.409 | 0.415 | 0.422 | 0.428 | 0.434 | 0.44  | 0.446 | 0.452 | 0.45  | 0.448 | 0.445 | 0.426 | 0.348 |

The summation matrix is populated by using the value matrix to calculate a distance-weighted sum of the values within a spacing radius of the center point of the cell selected in the value matrix. For each of the cells within the spacing radius selected by the user, the accumulated value (AccumValue) is determined using the relationships:

$$AccumValue = (CumWeightedValue/CumWeight) * CumWeightedArea,$$

wherein $$CumWeightedValue = \Sigma\ value*weight,\ \text{and}$$

$$CumWeightedArea = \Sigma\ area*weight,$$

Weight in the above calculations is derived using the relationship: weight=(SpacingRadius−DistanceFromCell)/SpacingRadius, wherein DistanceFromCell is defined as the larger of the actual distance from the cell for which the accumulated value is being calculated to the adjacent cell that is being taken into consideration or half the diagonal cell width (average distance to corner); and SpacingRadius is a cells are weighted by cell area, large cells or cells that are barely within reach of large cells may be improperly favored over small cells.

In the accumulation calculations of one embodiment of the present invention, by taking into account the distance and the cell size, the irregularities of the cell geometry may be significantly reduced in the target selection process.

Figure 7:
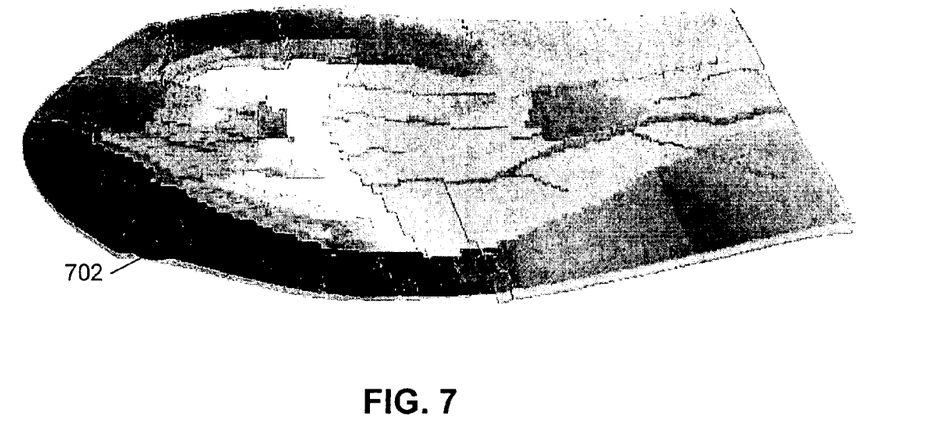
FIG. 7 illustrates the location of a first target location on a three-dimensional model of a reservoir in accordance with the principles of present invention.

Once the summation matrix is complete, the summation matrix is analyzed to determine the most desirable value (0.586) in the matrix. (See Table 2 above) Then, this value is selected as the first target location. FIG. 7 provides an illustration of the location of the first target location on a three-dimensional model of the reservoir of FIGS. 2 and 3. The value in the matrix associated with the first target and the values associated with other cells in the matrix that are within two times the user-defined spacing radius are set to a value of zero for the selection of the next target location.

Table 3 below illustrates the result of the above described process, wherein the value of the selected target location and the values within two times the spacing radius are set to zero.

TABLE 3

|    | y1 | y2 | y3 | y4 | y5 | y6 | y7 | y8 | y9 | y10 | y11 | y12 | y13   | y14   | y15   | y16   | y17   | y18   |
|----|----|----|----|----|----|----|----|----|----|-----|-----|-----|-------|-------|-------|-------|-------|-------|
| x1 | 0  | 0  | 0  | 0  | 0  | 0  | 0  | 0  | 0  | 0   | 0   | 0   | 0.411 | 0.399 | 0.37  | 0.342 | 0.33  | 0.282 |
| x2 | 0  | 0  | 0  | 0  | 0  | 0  | 0  | 0  | 0  | 0   | 0   | 0   | 0     | 0.407 | 0.375 | 0.349 | 0.335 | 0.279 |
| x3 | 0  | 0  | 0  | 0  | 0  | 0  | 0  | 0  | 0  | 0   | 0   | 0   | 0     | 0     | 0.38  | 0.358 | 0.34  | 0.278 |
| x4 | 0  | 0  | 0  | 0  | 0  | 0  | 0  | 0  | 0  | 0   | 0   | 0   | 0     | 0     | 0     | 0.368 | 0.346 | 0.276 |
| x5 | 0  | 0  | 0  | 0  | 0  | 0  | 0  | 0  | 0  | 0   | 0   | 0   | 0     | 0     | 0     | 0.379 | 0.354 | 0.275 |
| x6 | 0  | 0  | 0  | 0  | 0  | 0  | 0  | 0  | 0  | 0   | 0   | 0   | 0     | 0     | 0     | 0     | 0.364 | 0.275 |
| x7 | 0  | 0  | 0  | 0  | 0  | 0  | 0  | 0  | 0  | 0   | 0   | 0   | 0     | 0     | 0     | 0     | 0     | 0.276 |
| x8 | 0  | 0  | 0  | 0  | 0  | 0  | 0  | 0  | 0  | 0   | 0   | 0   | 0     | 0     | 0     | 0     | 0     | 0.28  |
| x9 | 0  | 0  | 0  | 0  | 0  | 0  | 0  | 0  | 0  | 0   | 0   | 0   | 0     | 0     | 0     | 0     | 0     | 0.283 |

TABLE 3-continued

|     | y1    | y2    | y3    | y4 | y5 | y6 | y7 | y8 | y9 | y10 | y11 | y12 | y13 | y14 | y15 | y16 | y17 | y18   |
|-----|-------|-------|-------|----|----|----|----|----|----|-----|-----|-----|-----|-----|-----|-----|-----|-------|
| x10 | 0.483 | 0     | 0     | 0  | 0  | 0  | 0  | 0  | 0  | 0   | 0   | 0   | 0   | 0   | 0   | 0   | 0   | 0.297 |
| x11 | 0.489 | 0     | 0     | 0  | 0  | 0  | 0  | 0  | 0  | 0   | 0   | 0   | 0   | 0   | 0   | 0   | 0   | 0     |
| x12 | 0.488 | 0.497 | 0     | 0  | 0  | 0  | 0  | 0  | 0  | 0   | 0   | 0   | 0   | 0   | 0   | 0   | 0   | 0     |
| x13 | 0.501 | 0.511 | 0     | 0  | 0  | 0  | 0  | 0  | 0  | 0   | 0   | 0   | 0   | 0   | 0   | 0   | 0   | 0     |
| x14 | 0.508 | 0.517 | 0.525 | 0  | 0  | 0  | 0  | 0  | 0  | 0   | 0   | 0   | 0   | 0   | 0   | 0   | 0   | 0     |

Figure 8:
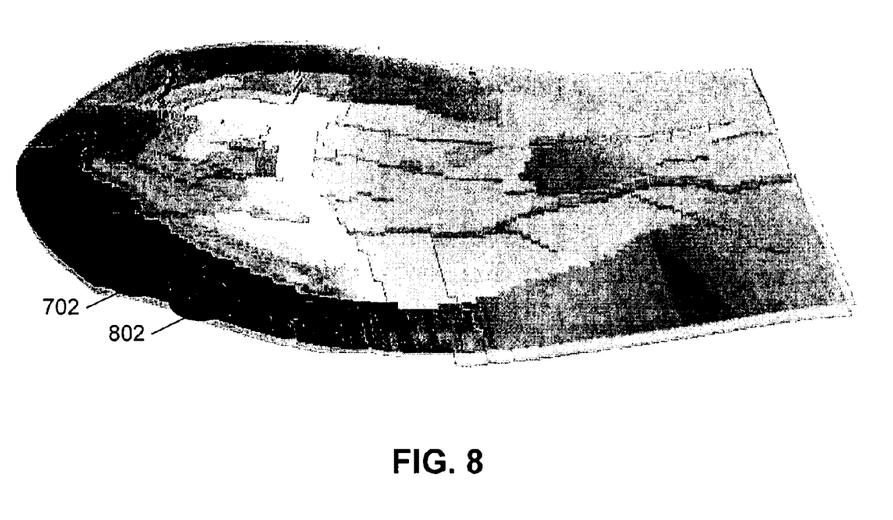
FIG. 8 illustrates the location of a second target on a three-dimensional model of a reservoir in accordance with the principles of the present invention.

Next from the remaining values in the summation matrix, the most desirable value (0.525) is selected as the second target location. (See Table 3 above) FIG. 8 provides an illustration of the location of the second target on a three-dimensional model of the reservoir displayed in FIGS. 2 and 3. In similar fashion to the process used to determine the next target after locating the first target, the value in the matrix associated with the second target and the value associate with other cells in the matrix that are within two times the user-defined radius is set to a value of zero for the selection of the next target.

Table 4 below illustrates the result of the above described process, wherein the value of the selected target location and the values within two times the spacing radius are set to zero.

TABLE 4

|     | y1 | y2 | y3 | y4 | y5 | y6 | y7 | y8 | y9 | y10 | y11 | y12 | y13   | y14   | y15   | y16   | y17   | y18   |
|-----|----|----|----|----|----|----|----|----|----|-----|-----|-----|-------|-------|-------|-------|-------|-------|
| x1  | 0  | 0  | 0  | 0  | 0  | 0  | 0  | 0  | 0  | 0   | 0   | 0   | 0.411 | 0.399 | 0.37  | 0.342 | 0.33  | 0.282 |
| x2  | 0  | 0  | 0  | 0  | 0  | 0  | 0  | 0  | 0  | 0   | 0   | 0   | 0     | 0.407 | 0.375 | 0.349 | 0.335 | 0.279 |
| x3  | 0  | 0  | 0  | 0  | 0  | 0  | 0  | 0  | 0  | 0   | 0   | 0   | 0     | 0     | 0.38  | 0.358 | 0.34  | 0.278 |
| x4  | 0  | 0  | 0  | 0  | 0  | 0  | 0  | 0  | 0  | 0   | 0   | 0   | 0     | 0     | 0     | 0.368 | 0.346 | 0.276 |
| x5  | 0  | 0  | 0  | 0  | 0  | 0  | 0  | 0  | 0  | 0   | 0   | 0   | 0     | 0     | 0     | 0.379 | 0.354 | 0.275 |
| x6  | 0  | 0  | 0  | 0  | 0  | 0  | 0  | 0  | 0  | 0   | 0   | 0   | 0     | 0     | 0     | 0     | 0.364 | 0.275 |
| x7  | 0  | 0  | 0  | 0  | 0  | 0  | 0  | 0  | 0  | 0   | 0   | 0   | 0     | 0     | 0     | 0     | 0     | 0.276 |
| x8  | 0  | 0  | 0  | 0  | 0  | 0  | 0  | 0  | 0  | 0   | 0   | 0   | 0     | 0     | 0     | 0     | 0     | 0.28  |
| x9  | 0  | 0  | 0  | 0  | 0  | 0  | 0  | 0  | 0  | 0   | 0   | 0   | 0     | 0     | 0     | 0     | 0     | 0.283 |
| x10 | 0  | 0  | 0  | 0  | 0  | 0  | 0  | 0  | 0  | 0   | 0   | 0   | 0     | 0     | 0     | 0     | 0     | 0.297 |
| x11 | 0  | 0  | 0  | 0  | 0  | 0  | 0  | 0  | 0  | 0   | 0   | 0   | 0     | 0     | 0     | 0     | 0     | 0     |
| x12 | 0  | 0  | 0  | 0  | 0  | 0  | 0  | 0  | 0  | 0   | 0   | 0   | 0     | 0     | 0     | 0     | 0     | 0     |
| x13 | 0  | 0  | 0  | 0  | 0  | 0  | 0  | 0  | 0  | 0   | 0   | 0   | 0     | 0     | 0     | 0     | 0     | 0     |
| x14 | 0  | 0  | 0  | 0  | 0  | 0  | 0  | 0  | 0  | 0   | 0   | 0   | 0     | 0     | 0     | 0     | 0     | 0     |

From the remaining values in Table 4, the most desirable value (0.411) may be selected for the third target location. Then, the method repeats the above process of zeroing the value of the selected target location and the values within two times the radius of the selected target location to determine the next target location. The above process may continue until a user-defined maximum cutoff is reached or all possible targets have been located. The above examples use two times the spacing radius; however, the other values of the spacing radius may be used. The above examples use one attribute value of interest, but the method maybe extended to use more than one attribute value to determine the target locations.

The foregoing method may also be extended to take into account existing wells (e.g., exploratory wells). For example, the values in the summation matrix within two times the spacing radius of the existing well(s) may be zeroed out before selecting the new targets.

Figure 9:
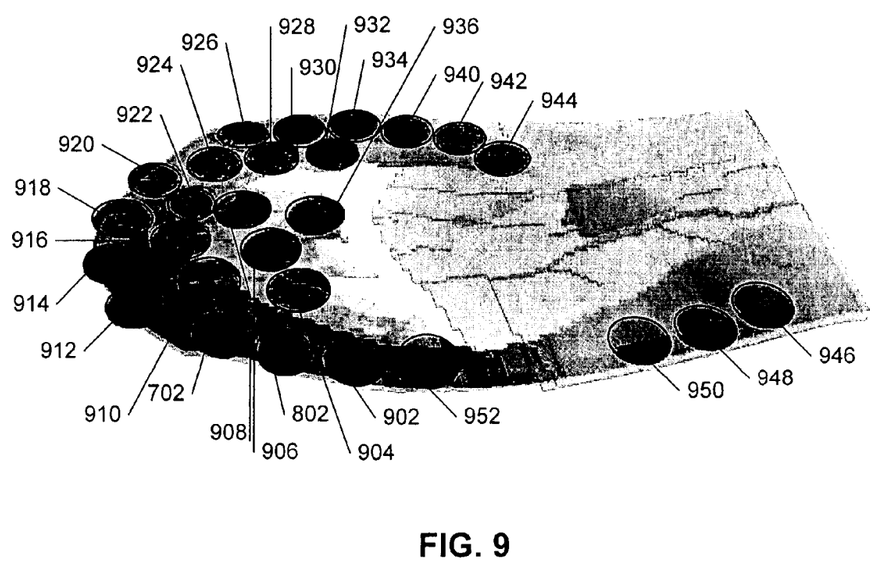
FIG. 9 illustrates all the located targets on a three-dimensional model of a reservoir in accordance with the principles of the present invention.

FIG. 9 provides an exemplary illustration of all the located targets (702, 802, and 902–952) on a three-dimensional model of the reservoir displayed in FIGS. 2 and 3.

Once all the possible targets have been located or the user-defined maximum has been reached, the target locations may be ranked, for example, from the most desirable (i.e., the first target location) to the least desirable (i.e., the last target location), and the user may display any percentage of the identified target locations.

Methodology

Figure 10:
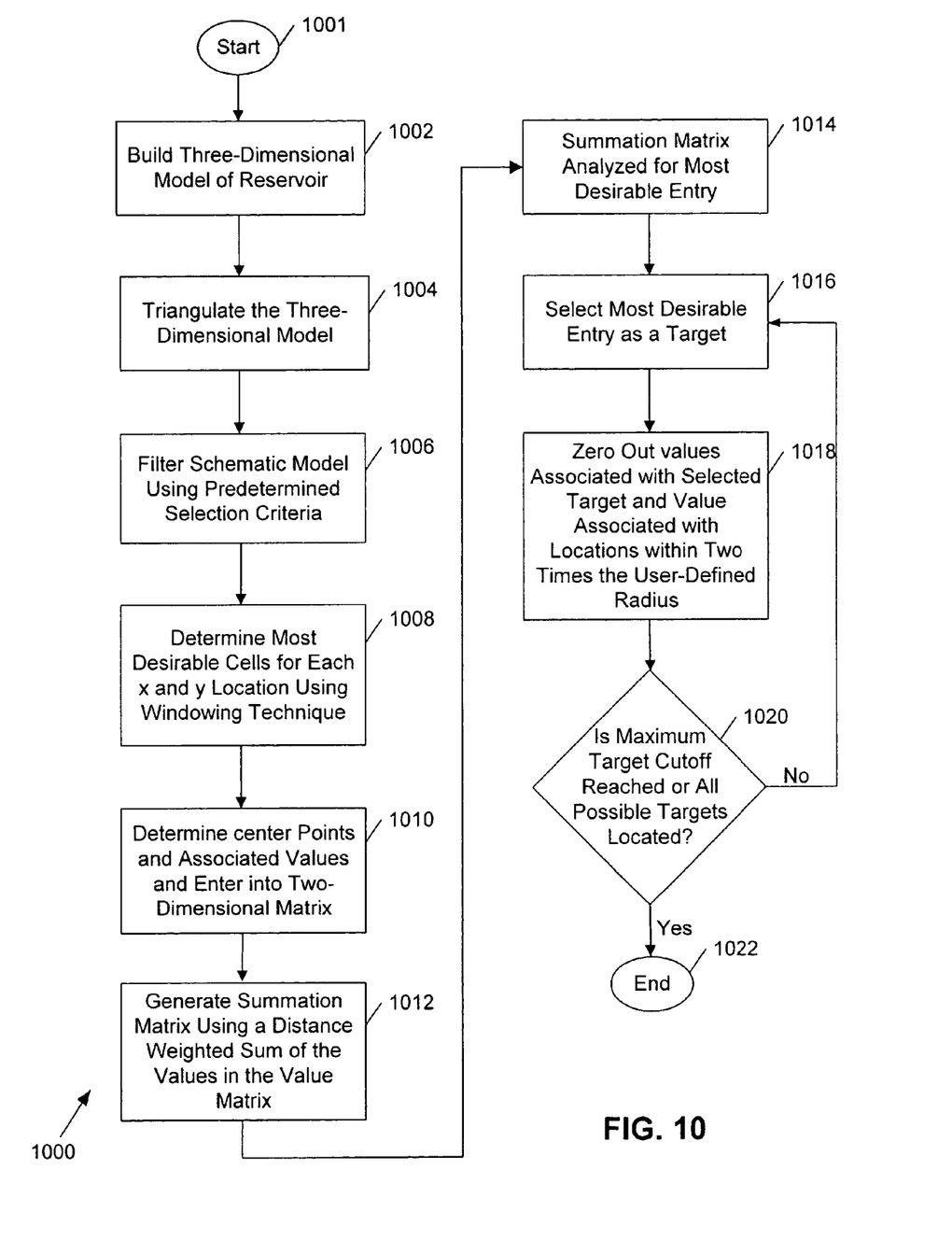
FIG. 10 is a flow chart illustrating the stages associated with the targeting method in accordance with the principles of the present invention.

FIG. 10 is a flowchart illustrating the stages associated with the targeting method of one embodiment of the present invention. Method 1000 starts at (Stage 1001) and proceeds to Stage 1002. In Stage 1002, seismic data sets are used to build a three-dimensional model (Stage 1002) using an interpreter program. The program interprets the seismic data sets both for the top and bottom of the reservoir to develop a three-dimensional model from the interpreted structures which bound the reservoir as well as define the internal geometry. The three-dimensional model provides a representation of the characteristics of the reservoir underneath the surface. These characteristics, e.g., porosity, may be indicative of whether there are hydrocarbons in the reservoir and the fluidity of the hydrocarbons that may be found.

Next, the three-dimensional model may be triangulated to create a three dimensional grid (X, Y, and Z axis) of cells (schematic model). (Stage 1004) Once the triangulation process is complete, for each X and Y coordinate, the schematic model is traversed in the Z direction to filter cell locations that do not meet a predetermined selection criteria (e.g., porosity >0.2 and/or oil saturation >0.3).

(Stage 1006)

From the filtered three-dimensional model, the method of the preferred embodiment determines the most desirable set of contiguous cells for each X and Y location traversed in the Z direction (through the layers of the three-dimensional model) that meet one or more of the filtering criteria. The most desirable cells may be located using a windowing technique in which a sliding window composed, for example, of three cells or three layers may be used to find the location of the most desirable three continuous layers for each X and Y location. (Stage 1008) The window size may be determined by the number of layers in the three-dimensional model.

Then, the location of the center point or the midpoint of the most desirable contiguous cells for each X and Y location in the schematic model is identified, along with the associated value for the particular property of interest (e.g., porosity or oil saturation value), and entered into a two-dimensional matrix. (Stage 1010) This process distills the schematic model down to a two dimensional value matrix representing the most desirable layers in the columns of the schematic model. Every column in the schematic model is represented by row and column indices (matrix entry) in the value matrix, and each matrix entry may contain the value of the property of interest (e.g., porosity or oil saturation).

Next, a summation matrix is generated based on the value matrix. (Stage 1012) The summation matrix includes the accumulated values for each of the entries in the value matrix. The summation matrix is populated by using the value matrix to calculate a distance-weighted sum of the values within the spacing radius of the center point of the cell selected in the value matrix. (Stage 1012) For each of the cells within a spacing radius selected by the user, the accumulated value (AccumValue) is determined using the relationships:

AccumValue=(CumWeightedValue/CumWeight)*
CumWeightedArea, wherein

CumWeightedValue=Σ value*weight, and

CumWeightedArea=Σ area*weight,

The "weight" in the above calculations may be derived using the relationship: weight=(SpacingRadius−DistanceFromCell/SpacingRadius, wherein DistanceFromCell is defined as the larger of the actual distance from the cell for which the accumulated value is being calculated to the adjacent cell that is being taken into consideration or the half the diagonal cell width (average distance to corner); and SpacingRadius is a user-defined value representing the reservoir draining radius for each target. The SpacingRadius may be selected by the user based on a number of parameters (e.g., government regulations and/or financial considerations).

Once the summation matrix is complete, the summation matrix is analyzed to determine the most desirable value in the matrix. (Stage 1014) Then, the location associated with this value is selected as the first target location (Stage 1016) and the value in the matrix associated with the first target and the values associated with other cells in the matrix that are within two times the user-defined spacing radius are set to a value of zero for the selection of the next target location (Stage 1018).

Next, method 1000 proceeds to Stage 1020. In this stage, if a user-defined maximum cutoff for the number of targets has been reached or all the possible target have been located, method 1000 ends. (Stage 1020 and 1022). However, if the above is not true, method 1000 returns to Stage 1016 and selects, from the remaining values in the summation matrix, the most desirable value as the next target location. Then, in similar fashion to the process used to determine the previous target, the value in the matrix associated with the current target and the value associated with other cells in the matrix that are within two times the user-defined spacing radius are set to a value of zero.

Again, method 1000 returns to Stage 1020 and determines if a user-defined maximum cutoff for the number of targets has been reached. If so, method 1000 ends. Otherwise, the method returns to Stage 1016 and 1018 for the selection of the next target. The loop created by Stages 1016–1020 may be executed until the cutoff is reached or all targets have been located; then method 1000 ends. (Stage 1022)

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of reservoir targeting, comprising:
    (a) building, from seismic data, a three dimensional model of a reservoir;
    (b) triangulating the three dimensional model of the reservoir to create a schematic model comprising a three dimensional grid of cells;
    (c) filtering the schematic model to eliminate cells with attribute values below a threshold and/or do not meet other predetermined selection criteria;
    (d) determining a set of contiguous cells for at least one selected X and Y location in the schematic model, wherein the set of contiguous cells is determined by moving a window of a plurality of cells to select a window of a plurality of cells that has a maximum value of a sum of values of an attribute of interest, wherein the sum is taken over the cells in the selected window, the plurality of cells having the maximum value of the sum being the most desirable cells for the at least one selected X and Y location;
    (e) recording a center of location of the most desirable cells along with an area of the cells and the maximum value of the sum of values of the attribute of interest for the at least one selected X and Y location in a first matrix, wherein the first matrix is a two dimensional matrix;
    (f) for each cell in the first matrix, taking each cell as a selected cell, calculating a distance weighted sum of values in the first matrix of all the cells within a multiple of a spacing radius from a center point of the selected cell, wherein a weight is selected to give more weight to cells located closer to the selected cell and less weight to cells located further from the selected cell and entering the distance weighted sum in a second matrix as an accumulated value for the selected cell;
    (g) selecting the cell location having a maximum accumulated value in the second matrix as a target location;
    (h) setting the value of the selected cell at the target location in the second matrix and the value of all the cells in the second matrix, within a multiple of the spacing radius, to zero in the first matrix;
    (i) repeating steps (f) to (h) until a specified number of target locations are identified or there are no more cells with an accumulated value greater than zero.

2. The method of claim 1, wherein the accumulated value (AccumValue) associated with each center location is derived using the relationship:

AccumValue=(CumWeightedValue/CumWeight)
*CumWeightedArea, wherein

CumWeightedValue=Σ cellvalue*weight,

CumWeightedArea=Σ cellarea*weight, and

CumWeight=Σ(SpacingRadius−DistanceFromCell)/
SpacingRadius, where DistanceFromCell is defined as the actual distance from the cell for which the accumulated value is being calculated to a cell that is being taken into consideration and SpacingRadius is a user-defined value representing a reservoir draining radius for each target location.

3. The method of claim 1, wherein selecting target locations includes determining whether there are existing targets for the reservoir, and if existing targets are identified, eliminating possible targets within a predetermined distance from the existing targets before selecting new targets.

4. The method of claim 3, wherein selecting target locations includes an iterative process of selecting the targets based on a first preferred attribute value, eliminating other targets within a predetermined distance from an initial target, and selecting a next preferred attribute value for a next target location.

5. The method of claim 1, wherein selecting target locations includes an iterative process of selecting a target based on a first preferred attribute value, eliminating other targets within a predetermined distance from an initial target, and selecting a next preferred attribute value for a next target location.

6. The method of claim 1, wherein selecting target locations further comprises ranking the selected target locations and displaying a user-selected percentage of the ranked target locations.

7. A computer-readable medium having computer-executable instructions which when executed on a computer perform a process for reservoir targeting, the process comprising:
(a) building, from seismic data, a three dimensional model of a reservoir;
(b) triangulating the three dimensional model of the reservoir to create a schematic model comprising a three dimensional grid of cells;
(c) filtering the schematic model to eliminate cells with attribute values below a threshold and/or do not meet other predetermined selection criteria;
(d) determining a set of contiguous cells for at least one selected X and Y location in the schematic model, wherein the set of contiguous cells is determined by moving a window of a plurality of cells to select a window of a plurality of cells that has a maximum value of a sum of values of an attribute of interest, wherein the sum is taken over the cells in the selected window, the plurality of cells having the maximum value of the sum being the most desirable cells for the at least one selected X and Y location;
(e) recording a center of location of the most desirable cells along with an area of the cells and the maximum value of the sum of values of the attribute of interest for the at least one selected X and Y location in a first matrix, wherein the first matrix is a two dimensional matrix;
(f) for each cell in the first matrix, taking each cell as a selected cell, calculating a distance weighted sum of values in the first matrix of all the cells within a multiple of a spacing radius from a center point of the selected cell, wherein a weight is selected to give more weight to cells located closer to the selected cell and less weight to cells located further from the selected cell and entering the distance weighted sum in a second matrix as an accumulated value for the selected cell;
(g) selecting the cell location having a maximum accumulated value in the second matrix as a target location;
(h) setting the value of the selected cell at the target location in the second matrix and the value of all the cells in the second matrix, within a multiple of the spacing radius, to zero in the first matrix;
(i) repeating steps (f) to (h) until a specified number of target locations are identified or there are no more cells with an accumulated value greater than zero.

8. The computer-readable medium of claim 7, wherein developing the second accumulated value matrix further comprises deriving a accumulated value (AccumValue) associated with each center location using the relationship:

AccumValue=(CumWeightedValue/CumWeight)* CumWeightedArea, wherein

CumWeightedValue=Σ cellvalue*weight,

CumWeightedArea=Σ cellarea*weight, and

CumWeight=Σ(SpacingRadius−DistanceFromCell)/ SpacingRadius, where DistanceFromCell is defined as the actual distance from the cell for which the accumulated value is being calculated to a cell that is being taken into consideration and SpacingRadius is a user-defined value representing a reservoir draining radius for each target location.

9. The computer-readable medium of claim 7, wherein selecting target locations includes determining whether there are existing targets for the reservoir, and if existing targets are identified, eliminating possible targets within a predetermined distance from the existing targets before selecting new targets.

10. The computer-readable medium of claim 9, wherein selecting target locations includes an iterative process of selecting the targets based on a first preferred attribute value, eliminating other targets within a predetermined distance from an initial target, and selecting a next preferred attribute value for a next target location.

11. The computer-readable medium of claim 7, wherein selecting target locations includes an iterative process of selecting a target based on a preferred attribute value, eliminating other targets within a predetermined distance from a initial target, and selecting a next preferred attribute value for a next target location.

12. The computer-readable medium of claim 7, wherein selecting target locations further comprises ranking the selected target locations and displaying a user-selected percentage of the ranked target locations.

* * * * *